Patented June 10, 1924.

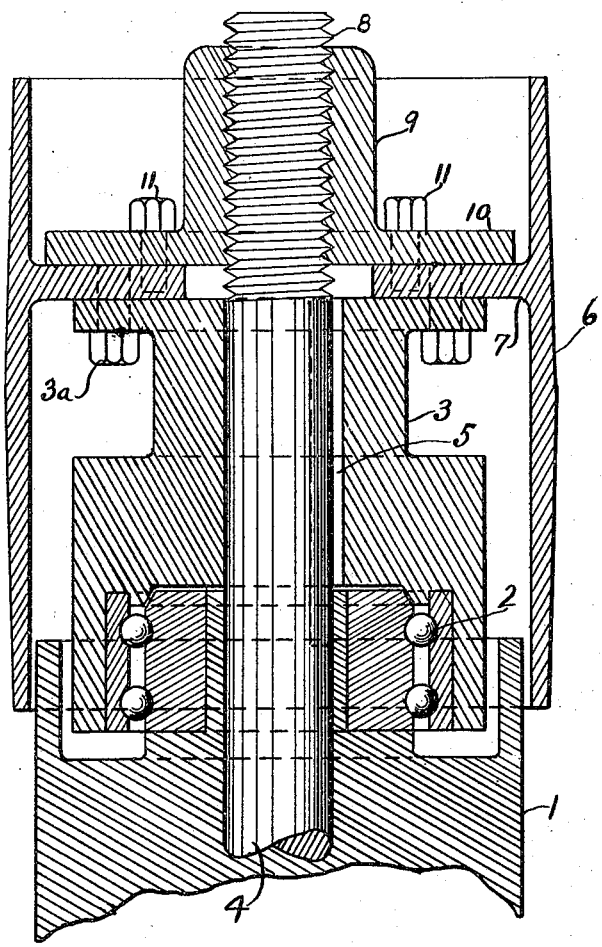

1,497,122

UNITED STATES PATENT OFFICE.

ABRAHAM RODRIGUEZ AND HENRY GUSTAVSON, OF SAN JOSE, CALIFORNIA, ASSIGNORS TO MILTON G. MOENNING AND DOUGLAS C. HOWARD, BOTH OF SAN JOSE, CALIFORNIA.

PUMP HEAD.

Application filed October 8, 1921. Serial No. 506,500.

*To all whom it may concern:*

Be it known that we, ABRAHAM RODRIGUEZ and HENRY GUSTAVSON, citizens of the United States, and residents of San Jose, in the county of Santa Clara and State of California, have invented certain new and useful Improvements in Pump Heads, of which the following is a specification.

It is the object of our invention to provide a pulley mounting for a deep well centrifugal pump provided with means whereby the pump shaft may be quickly, easily and accurately adjusted. It is a further object to provide a novel means for adjusting the pump shaft, and locking the same to the pulley without the use of projecting parts which become dangerous when revolving at high speed.

The drawing is a vertical transverse section through a portion of our improved pump head.

Referring more particularly to the drawing, 1 indicates a portion of a pump head fitted with ball bearings 2. On ball bearings 2 rests a sleeve 3 in such a manner as to revolve freely on head 1. In sleeve 3 and head 1 is positioned pump shaft 4, the shaft and sleeve being locked together by a key 5.

At 6 is shown a pulley provided with an inwardly extending annular flange 7 bolted to sleeve 3 as shown at 3ª. The upper end of shaft 4 is threaded as at 8 to engage adjusting nut 9, the latter having an outwardly extending annular flange 10 resting on flange 7 of pulley 6.

In assembling the pulley may be held stationary and the adjusting nut 9 turned sufficiently to lift the shaft 4 the required distance, the same being then bolted to flange 7 by bolts 11 as shown.

By means of this construction a delicate adjustment for the shaft 4 is provided whereby the runners supported thereby may be accurately suspended in the pump bowls. Furthermore the key 5 is entirely covered so that there are no projecting parts revolving at high speed. In this construction also, the pulley, shaft, sleeve and bearing are all locked together to form a unitary structure.

An important feature in this construction is that the sleeve 3 is sufficiently loose to slidably engage the ball bearings 2, so that when the adjusting nut 9 is removed the pulley and sleeve may be lifted off of the bearings and separated in a moment by removing the bolts 3ª.

It is to be understood, of course, that while we have herein shown and described one particular embodiment of our invention we do not wish to be confined to the disclosure but to make changes in form, construction and method of operation within the scope of the appended claim.

We claim:

In combination, a pump head provided with ball bearings, a sleeve slidably and revolubly mounted on said bearings, a shaft in said sleeve and revoluble therewith, a pulley provided with an inwardly extending flange for engagement with said sleeve, and means for removably securing said pulley to said sleeve, an adjusting nut operatively mounted upon the upper end of said shaft, and means for securing said nut to said pulley flange.

ABRAHAM RODRIGUEZ.
HENRY GUSTAVSON.